United States Patent [19]

Sichling et al.

[11] 4,408,123

[45] Oct. 4, 1983

[54] FIBER OPTICAL SENSOR DEVICE FOR MEASURING A PHYSICAL PARAMETER

[75] Inventors: Georg H. Sichling, Corvallis, Oreg.; Helmut Schwab; Bernard Schwab, both of Princeton, N.J.

[73] Assignee: Siemens Corporation, Iselin, N.J.

[21] Appl. No.: 230,808

[22] Filed: Feb. 2, 1981

[51] Int. Cl.³ .......................... G01D 5/30; G01J 3/34
[52] U.S. Cl. ................................. 250/226; 250/231 R
[58] Field of Search .................. 250/226, 227, 231 R; 356/352

[56] References Cited

U.S. PATENT DOCUMENTS 4,223,216 9/1980 Quick et al. ............... 250/231 R X
4,329,058 5/1982 James et al. ........................ 356/352

OTHER PUBLICATIONS

K. A. James, W. H. Quick and V. H. Strahan, "Fiber Optics: The Way to True Digital Sensors?", *Control Engineering*, Feb. 1979, pp. 30-33.

Primary Examiner—David C. Nelms
Assistant Examiner—Edward P. Westin
Attorney, Agent, or Firm—Karl F. Milde, Jr.

[57] ABSTRACT

A fiber optical sensor device is provided for measuring a physical parameter. The sensor device contains a light source which emits a light beam into the end of a first light transmitting fiber. Light delivered from the output end of the fiber is directed to a light dispersing or selecting device such as a prism or an interference filter. This device disperses or splits the light transmitted by the first light transmitting fiber into its spectral components. The sensor device also contains a second light transmitting fiber. The input end of this second fiber receives the spectral components, whereby the components to be transmitted by the second fiber are selected dependent upon the physical parameter to be measured. The output end of the second fiber directs the selected component(s) to a light detector which measures the component intensity. The output signal of the detector is a measure of the physical parameter.

6 Claims, 20 Drawing Figures

FIBER OPTICAL SENSOR DEVICE FOR MEASURING A PHYSICAL PARAMETER

BACKGROUND OF THE INVENTION

1. Field of the Invention

This invention relates to a novel and improved sensor device for measuring a physical parameter at a first location which is remote from a second location. In particular, this invention relates to a sensor device which incorporates fiber optical signal transmission concepts.

2. Description of the Prior Art

Fiber optical signal transmission has become a significant technological innovation in electronic systems during recent years. Among the reasons for preference of fiber optical signal transmission to the former electric signal transmission is the availability of additional band width combined with the elimination of electromagnetic interferences. Other reasons include the convenient separation of the electric potentials of various system components.

Fiber optical transmission has been used for medium and long distance communication and for digital data transmission in certain industry applications where electromagnetic interference or electric separation is of special significance. Fiber optical transmission lines have also been used in connection with high voltage switching, power plant control and process control of electric furnaces. The application in aircraft and in automobiles is discussed.

In control systems signal communication in digital form is performed not only between data processing units but also in communication with input and output devices. Special signal sensitivity exists between sensors and data processing devices. Therefor, fiber optical communication on digital basis has been used for signal transmission between sensors and the control system (Control Engineering, February 1979, pages 30-33). The sensor devices serve to acquire input information relative to physical parameters which are of significance for the control system, such as temperature, pressure, position, flow, speed, etc.

In order to obtain a sensor device of high accuracy, it is advisable to convert the physical parameter to be measured directly into an optical signal and to transmit this signal through an optical fiber transmission line to the evaluation side of the electronic system. For this purpose, sensor devices may be designed so that they do not require an energy source on the measurement side. Such sensor devices work entirely on optical principles and operate strictly with fiber optical signal transmission. These sensor devices may be termed "passive sensor devices". They have the inherent benefit of high protection against electromagnetic interference and system simplicity.

Sensor devices may also be designed so that they utilize an auxiliary energy source for the sensing function in order to arrive finally at optical signals which may be transmitted through the optical fiber transmission line. The energy source may be an optical, an electrical or any other source, while the sensing principle and the signal transmission are still of optical nature. Such devices may be termed "active sensor devices". The provision of an auxiliary energy source on the measurement side usually results in additional expenditures.

SUMMARY OF THE INVENTION

1. Objects

It is an object of this invention to provide a sensor device for measuring a physical parameter at a first location which is remote from a second location, whereby the measurement signal is not or only to a small extent subject to environmental disturbances.

It is another object of this invention to provide a fiber optical sensor device which can withstand hostile environmental conditions, such as humidity, oil, acid and electromagnetic interference.

It is still another object of this invention to provide a fiber optical sensor device for transmission of a physical parameter from one location to another through a fiber optical transmission line, which device has a very simple structure.

It is still another object of this invention to provide a fiber optical sesor device which can be manufactured relatively simply and inexpensively.

It is still another object of this invention to provide a fiber optical sensor system that requires a single light source for obtaining a measurement signal from the measurement side which is remote from the evaluation side.

It is still another object of this invention to provide a fiber optical sensor device which may be used for automotive applications.

2. Summary

According to this invention, a fiber optical sensor device for measuring a physical parameter contains a light source which emits light towards a first light transmitting fiber or fiber optical cable. The light is received by the light input end of the fiber and transmitted to its light output end. A light dispersing and/or selecting device such as a prism or an interference filter is arranged at the light output end of the first light transmitting fiber. This device disperses or splits the light received from the first light transmitting fiber into its spectral components. The sensor device also contains a second light transmitting fiber. The light input end of the second fiber receives individual spectral components, whereby the selection of these components is dependent upon the physical parameter to be measured. The second fiber emits the spectral component(s) through its light output end. Associated with this light output end is a light detector for detecting the spectral component(s) emitted by the second light transmitting fiber. The output signal of the detector is a measure of the physical parameter.

The foregoing and other objects, features and advantages of the invention will be apparent from the following more particular description of preferred embodiments of the invention, as illustrated in the accompanying drawings.

BRIEF DESCRIPTION OF THE DRAWINGS

For the same or equivalent components and elements, the same reference numerals are used in all FIGS. 1-19.

DESCRIPTION OF THE PREFERRED EMBODIMENTS

Figure 1:
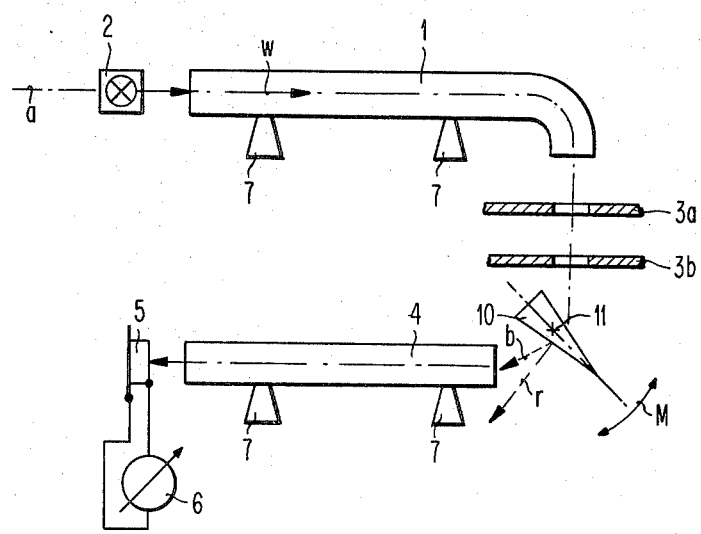
FIG. 1 is an embodiment of a fiber optical sensor device containing a prism for measuring a physical parameter.

In the schematic representation of FIG. 1, one end of a first light transmitting fiber or fiber input line 1 is illuminated by the light of a light source 2. The fiber input line 1 is made of a light conducting material and can be flexible, as shown in FIG. 1 at its end portion. The fiber input line 1 may be a single optical fiber. Preferably, however, it is a fiber optical cable containing various glass fibers. The axis of symmetry is denoted as a.

The light source 2 emits a relatively wide spectrum of light. It may, for instance, exhibit white light w, which contains all visible spectral components. The light source 2 may be an incandescent lamp or a multitude of LEDs which radiate in different spectra. The light source 2 may emit infrared, visible or ultraviolet light.

The light of the light source 2 is conducted to the other end of the optical cable 1 and from there through a collimator containing two diaphragms 3a and 3b to a light dispersing element, which is represented by a prism 10. The diaphragms 3a and 3b of the collimator are positioned between the optical cable and prism 10 parallel to and spaced from each other in order to obtain at least a fairly parallel light beam. The orifices or holes in both plates 3a and 3b are equal to or smaller than the diameter of the light transmitting core of the input line 1. The prism 10 causes splitting of the incoming light beam into its spectral colors. In the example shown, only the high frequency component or blue component b reaches the input end of a second light transmitting fiber or fiber output line 4. The long-wave or red component r is lost.

The prism 10 can be rotated about an axis 11. Rotation is affected under the influence of the parameter or quantity M to be measured. Alternatively, the prism 10 could be maintained in a fixed position, whereas the input end of the fiber output line 4 could be rotated with respect to the prism 10. Application of a prism 10 is less expensive than the use of other color selective or light dispersing elements such as a Fabry-Perot etalon.

The fiber output line 4 is of the same structure as the fiber input line 1. Light leaving the fiber output line 4 reaches a light detector 5 sensitive to the received light. This light detector 5 is arranged directly at the end of the light fiber output line 4. The light detector 5 is preferably a photo-electronic device including, for instance, a photo diode. In the example shown, it is a photo-element. The output voltage of the light detector 5 is measured by means of a measuring instrument 6 or otherwise processed. The fiber input line 1 and/or the fiber output line 4 may be fixed by means of attachment elements 7.

Under the action of the parameter M to be measured, the prism 10 is rotated about its axis 11. As the prism 10 rotates, various spectral components impinge upon the entrance end of the return fiber cable 4, thus causing various colors to be received by the photo detector 5. The intensity of the impinging light is measured. When the prism 10 moves under the influence of the parameter M clockwise in the direction indicated by the double arrow, the frequency of the light received by the fiber output line 4 will continuously decrease until finally only the red light component r of the white light w is received and measured by the light detector 5.

Any physical parameter, e.g. pressure, temperature, location, variation etc., which permits exerting a force in the direction of the double arrow, can be used as quantity M to be measured.

The detector 5, in order to differentiate between the different colors, should either exhibit a varying sensitivity over the spectral range of the light source 2, or a special filter (not shown) should be placed in front of the actual receiver, which filter-receiver-combination provides such property.

Figure 2:
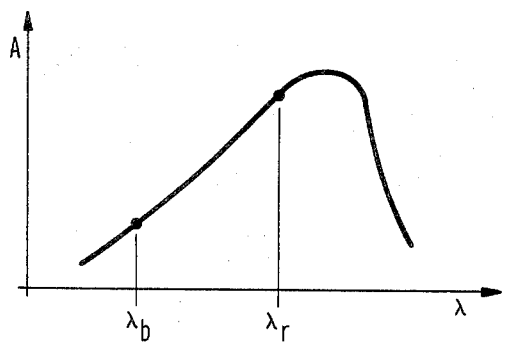
FIG. 2 is a diagram showing the sensitivity of the detector used in FIG. 1 dependent upon the light wave length.

In FIG. 2 is illustrated the known relationship between the relative spectral sensitivity A and the wave length $\lambda$ of a photo-electronic germanium element which can advantageously be used as the photo detector device 5. The detector 5 is frequency selective. It is evident from the diagram of FIG. 2 that in the spectral range between the wave length $\lambda_b$ of the blue light component b and the wave length $\lambda_r$ of the red light component r, the sensitivity A varies almost in direct proportion to the wave length $\lambda$ or in inverse proportion to the light frequency. The same is true for the measurement value indicated by the measuring instrument 6. It is important that a definite relationship exists between this value and the position of the prism 10 which is rotated under the influence of the parameter M to be measured.

Figure 3:
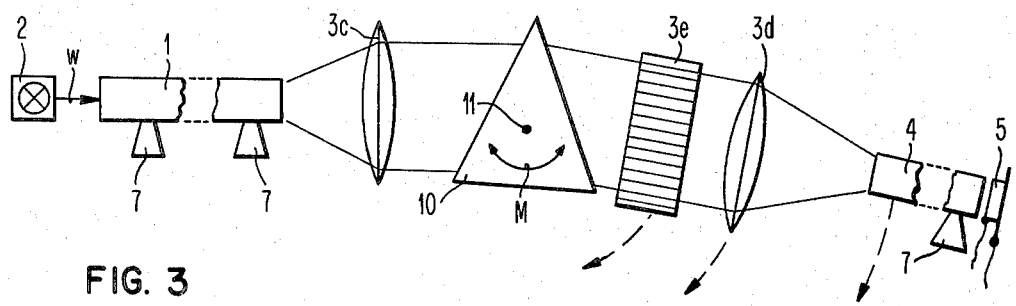
FIG. 3 is a modified embodiment of a fiber optical sensor device containing a prism.

FIG. 3 shows an embodiment of a fiber optical sensor which is similar to that shown in FIG. 1. This embodiment may be applied for precision measurements. In order to avoid the divergence of the light beam emitted from the input line 1, a first lens 3c is arranged between the output end of fiber-optical line 1 and the prism 10. The output end is located in the focal point of the lens 3c. Thus, the first lens 3a provides for a parallel light beam. A second lens 3d is arranged between the prism 10 and the input end of the output fiber 4. This lens 3d concentrates the dispersed light beam into the input end of the line 4 which is positioned in its focal point. Both lenses 3c and 3d may be of low dispersion. The arrangement of the lenses 3c, 3d and the prism 10 is the same as in the wellknown prism spectrometer. That is, the prism 10, the second lens 3d and the orifice of the fiber output line 4 may be rotated about the axis 11 of the prism 10. Rotation of the assembly composed of the prism 10, the lens 3d, the orifice of the fiber 4 will result in a change of color in accordance with the physical parameter M. This color change will be determined by the detector device 5.

It is of advantage to include into the assembly a direction filter or collimator 3e. This direction filter 3e may be arranged between the prism 10 and the input end of the fiber line 4. The direction filter 3e provides for elimination of rays which are not incident under a specific angle.

Figure 4:
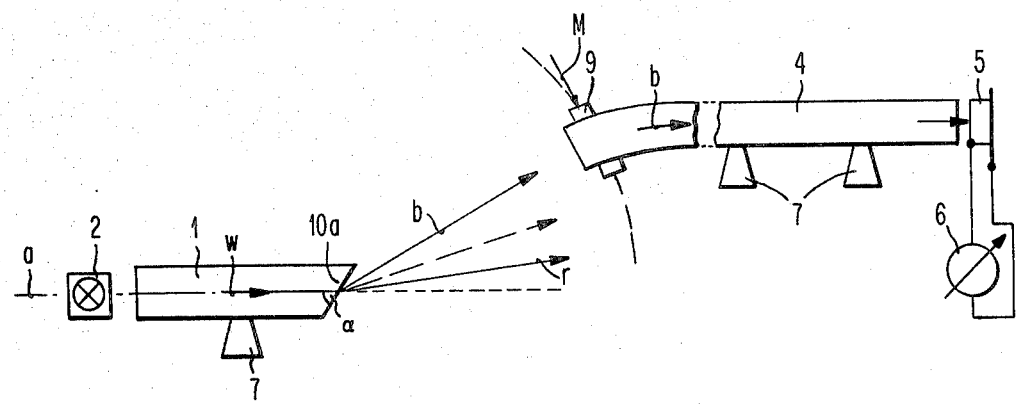
FIG. 4 is an embodiment of a fiber optical sensor device containing a prism formed at the end of a transmission line.

FIG. 4 shows an embodiment of a fiber optical sensor device which is a variant of the embodiment of FIG. 1. The main difference between FIGS. 1 and 4 is that in FIG. 4 the spectral separation of the white light w emitted by the light source 2 is effected by the fiber input line 1 itself. For this purpose, the output end of the fiber input line 1 is provided with an end face which encloses with the axis of symmetry a an acute angle α. The angle α may be about 45°. At the end face of the input line 1, the white light w is separated into its spectral colors. Thus, the output end operates as a prism 10a. The dispersed light including the blue and red components b and r is directed to the input end of the fiber output line 4. In the position shown, only the high frequency component b reaches the input face of the fiber output line 4.

The fiber input line 1 and the rear part of the light output line 4 are spatially fixed by means of attachment elements 7, while the front part of the fiber output line 4 can be moved by means of a member 9 under the action of the parameter M. The member 9 consists of a ring embracing the end, and a rod. Movement can be performed on a circle around the end face of the light input line 1. Thereby, light of changing colors is received by the light detector 5.

Generally speaking, FIG. 4 shows an embodiment which uses a cut oblique to the symmetry axis a at the output end of the incoming fiber line 1 to obtain the prism effect. This embodiment further uses a transversely movable output fiber 4 for a selective light frequency pick-up, whereby the movement of the end part of fiber 4 is related to the parameter M to be measured (pressure, temperature, position, etc.).

Figure 5:
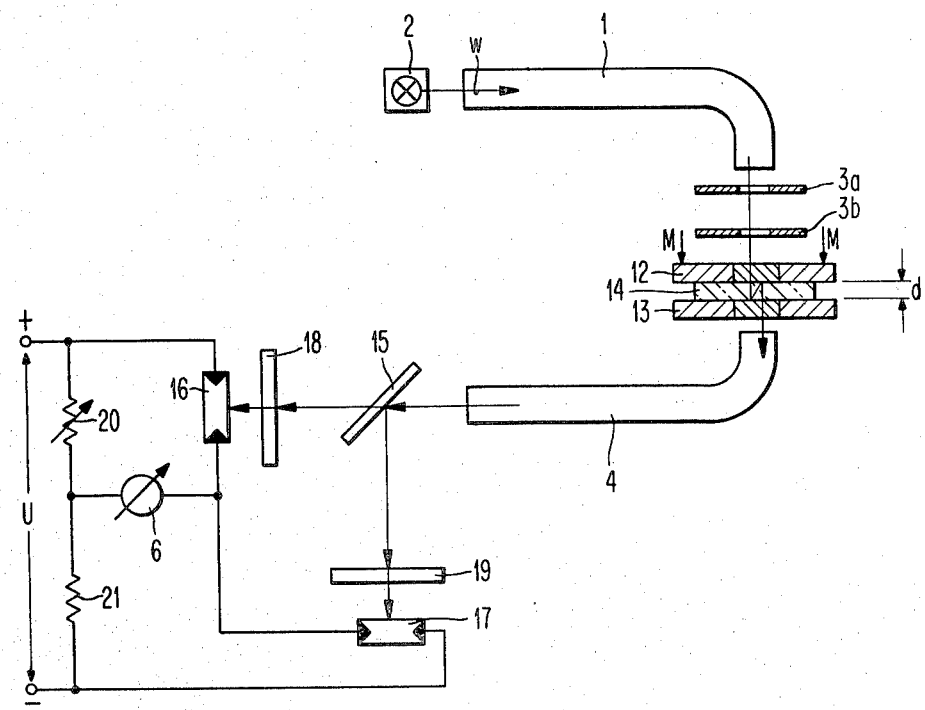
FIG. 5 is still an embodiment of a fiber optical sensor device containing an interference filter and a light detector in bridge configuration.

FIG. 5 shows an embodiment where the frequency selection of the light component received by the light fiber output line 4 is performed by means of an interference filter 12-14. This interference filter 12-14 may be designed in the manner of the known Fabry-Perot interferometer. The interference filter 12-14 consists essentially of two plane quartz plates 12 and 13 (Fabry-Perot plates) arranged parallel to each other at some distance d. They are provided on their outer faces with vapor-deposited antireflection coatings, and they are mirror-coated on their inner faces turned toward each other. Between the plates 12 and 13 there may be air or a transparent plastic material 14. If the distance d is varied under the action of the quantity M to be measured, for example by means of a piezoelectric or magnetostrictive spacer 14 arranged between the two plates 12 and 13, field strength measurements may be performed.

In such an interference filter 12-14, transmission maxima with very small half widths occur at certain wavelengths. These wavelengths are essentially determined by the distance d between the two plates 12 and 13, and by the index of refraction of the medium between the plates 12 and 13. Hence, only light having certain wavelengths is transmitted, and the intensity of the red and blue light components is a measure of the transmitted wavelength and thereby of the distance d of the plates 12 and 13.

To determine the transmitted light components and hence ultimately to determine the quantity M, the light emerging from the light fiber output line 4 is supplied via a beam splitter 15 to a first and a second light sensitive device, each consisting of a photoresistor or photoconductive cell 16 and 17, respectively, and a preceding absorption filter 18 and 19, respectively. The photoconductive cells 16, 17 along with two additional resistors 20, 21 form a bridge circuit. This bridge circuit is fed by a stabilized dc voltage U. In the diagonal of the bridge a measuring instrument 6 is arranged. This measuring instrument 6 is designed as a zero indicator, so that aside from the magnitude the direction of the quantity M can also be determined. The resistor 20 is variable and permits zero adjustment is a simple manner.

The operation of the arrangement shown in FIG. 5 will now be explained in conjunction with FIGS. 6 and 7.

Figure 6:
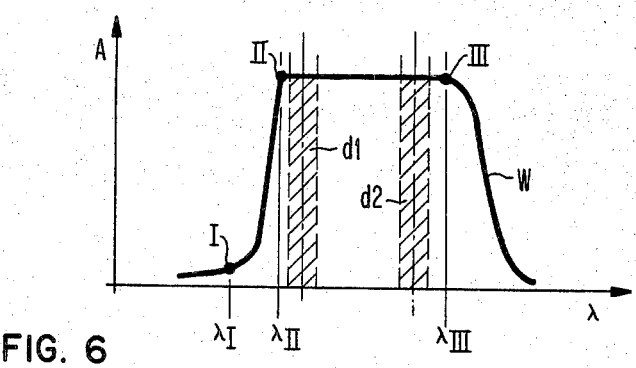
FIG. 6 is a sensitivity diagram for the embodiment of FIG. 5.

In FIG. 6, the curve W designates the spectral distribution of the light emitted by the light source 2. The amplitude of the emitted light wave components having a wavelength less than $\lambda_I$ is negligibly small. Light wave components of a wave length between $\lambda_{II}$ and $\lambda_{III}$ have a maximum amplitude which is essentially constant. Starting with the wavelength $\lambda_{III}$, a rapid decline of the intensity of the respective light components takes place. Under the effect of the quantity M to be measured, the mutual distance d of the two plane-parallel plates 12 and 13 of the interference filter 12-14 is assumed to range between a minimum value d1 and a maximum value d2. Accordingly, in these positions d1 and d2 the interference filter 12-14 transmits light of the respectively marked spectral ranges shown hatched in FIG. 6.

Figure 7:
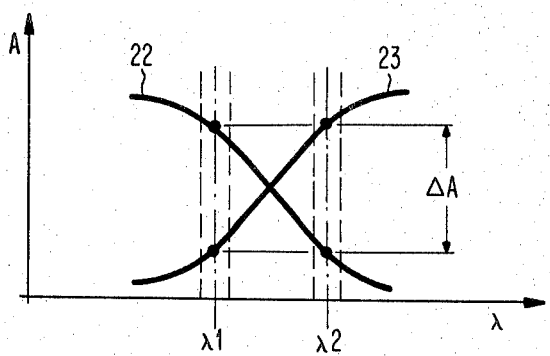
FIG. 7 is a sensitivity diagram of other characteristics of the embodiment of FIG. 5.

In FIG. 7, the curve 22 indicates the relative spectral sensitivity A as a function of the wavelength λ for the first receiving device consisting of the absorption filter 18 and the photoconductive cell 16. The curve 23 represents the curve of the corresponding sensitivity A for the second receiving device consisting of the absorption filter 19 and the photoconuctive cell 17. By suitable selection of the absorption filters 18, 19 and of the photoconductive cells 16, 17, it can be achieved that in the spectral range between $\lambda_1$ and $\lambda_2$ (corresponding to d1 and d2, respectively) the sensitivity curves 22, 23 and hence also the resistance values of the corresponding photoconductive cells 16, 17, vary linealy and more important, oppositely to each other with the wavelength λ. The receiving devices may be chosen such that a symmetrical relative position of the sensitivity characteristics 22 and 23 prevails. Upon vairation of the distance d between the plane-parallel plates 12 and 13 from the value d1 to the value d2, the resistance of each of the two photoconductive cells 16 and 17 will vary by a maximum value corresponding to the sensitivity variation ΔA. As the photoconductive cells 16, 17 are arranged in a bridge circuit, this resistance variation is utilized twofold and results in a great deflection of the measuring instrument 6.

For the full utilization of the linear part of the sensitivity curves 22, 23 of the two light receiving devices and for the suppression of secondary maxima of the interference filter, it may by appropriate to use a filter (not shown in FIG. 5) for the light emitted by the light source 2.

Figure 8:
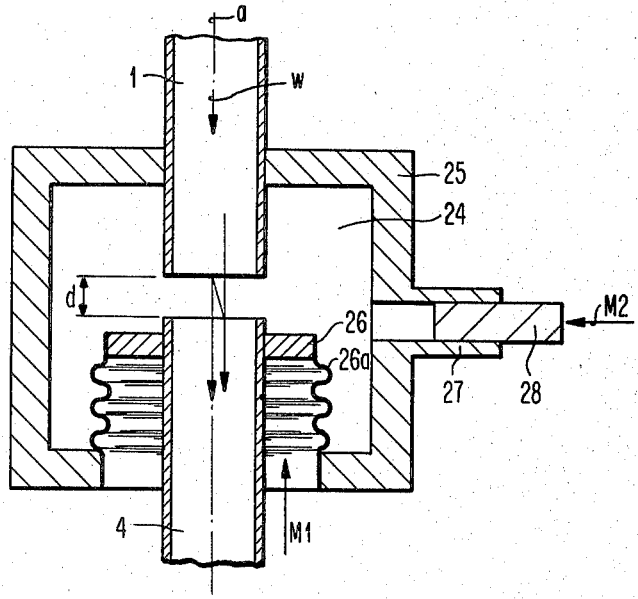
FIG. 8 is an embodiment of a fiber optical sensor device for measuring pressure.

FIG. 8 shows an embodiment containing a particularly simple construction of an interference filter. The reflection surfaces facing each other are here the exit face end of the light fiber input line 1 and the entrance face end of the light fiber output line 4. These face ends are arranged plane-parallel to each other. They may be partially coated with a layer of a light reflecting substance. In the gap may be arranged an elastic medium. This medium may be optically more dense than the lines 1 and 4. It may be any of the wellknown substances used in Fabry-Perot interferometers, such as an oil. The two light fiber lines 1 and 4 extend into a fully enclosed housing 25 which is filled with a gaseous medium 24. The light fiber input line 1 is firmly connected with the housing 25, whereas the light fiber output line 4 is movable along its axis of symmetry a under the influence of a quantity M1 to be measured. This mobility is achieved by means of a mount or end plate 26 and an elastic bellows 26a. The bellows 26a is secured with its one end to the plate 26 and with its other end of the housing 25.

Assuming the case that each variation of the quantity M1 causes a proportional variation of the distance d between the light fiber lines 1 and 4, the wavelength of the light transmitted by this filter is proportional to the quantity M1 to be measured. To this extent the function of this embodiment corresponds to that of FIG. 5.

In the arrangement according to FIG. 8, it is further provided that an additional quantity or parameter M2 can influence the wavelength of the light passed by the filter. To this end, there is provided at the housing 25 a hollow-cylindrical tube piece 27, in the bore of which a plug 28 can slide practically without play. A movement of this plug 28 under the action of the quantity M2 results in a pressure variation of the gaseous medium 24 inside the housing 25. Since the coefficient of refraction of a gaseous medium varies with its density, from the pressure variations in the interior of the housing 25 there result corresponding variations of the index of refraction. Accordingly, the wavelength of the transmitted light is dependent upon both quantities M1 and M2. The quantities may preferably represent pressures.

An advantage of the design according to FIG. 8 is that it works simply on an optical basis. It allows for measurement of an absolute pressure M1, if the quantity M2 is kept constant.

Figure 9:
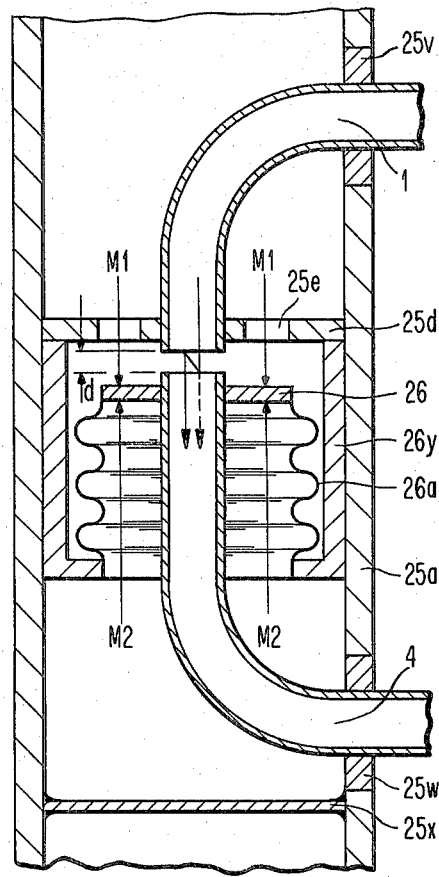
FIG. 9 is an embodiment of a fiber optical sensor device for measuring the difference between two pressures.

In FIG. 9 is illustrated a measuring device which can be used for measuring the difference (M1−M2) of two pressures M1, M2. In this embodiment, the housing 25a is a tube. In the upper end of tube 25a the pressure M1 prevails. A disc or plates 25d containing several holes therethrough is secured within the tube 25a. The first fiber optical transmission line 1 extends into the upper part of the tube 25a. It is secured therein by means of an upper pressure tight wall element 25. The output end of the line 1 is secured in a hole arranged in the central portion of the disc 25d. This end represents the fixed end of the measuring device.

The movable end of the measuring device is represented by the light input end of the second fiber optical transmission line 4. This face end is positioned opposite to the first mentioned face end by means of a movable member or plate 26. The plate 26 is tightly secured to the upper end of a bellows 26a, the lower end of which is fastened to the inner walls of the tube 25a by means of an annular body 26y. The flexible end of the second fiber optical transmission line 4 is introduced into the interior of the tube 25a through a lower pressure-tight wall member 25w in the lower part of the tube 25a. As will be noted, the input end of the second line 4 is movable perpendicularly with respect to the output end of the first line 1. The distance d of the gap between these ends depends on the pressure difference (M1−M2). As in the embodiments of FIGS. 5 and 8, the transmitted wavelength depends on the difference d.

As indicated in the lower part of FIG. 9, in the interior of the tube 25a, there may be provided a covering element or covering disc 25x. This covering element 25x, along with the walls of the lower tube portion, the walls of the bellows 26a and the plate 26, forms a vacuum-tight chamber. This chamber contains a reference pressure M2. The reference M2 may either be zero (evacuated chamber) or have a predetermined value other than zero. In this case the measuring device will measure the difference pressure (M1−M2), that is the pressure which is in excess of the reference pressure M2.

Figure 10:
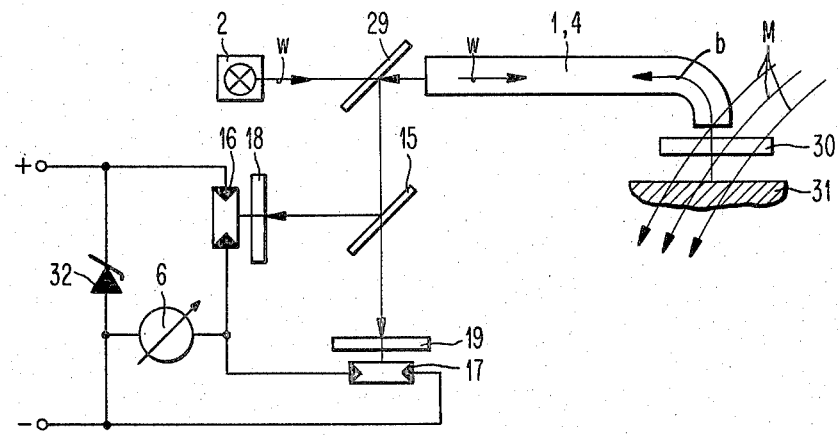
FIG. 10 is still another embodiment of a fiber optical sensor device containing an interference filter, a reflector and a light detector in bridge configuration.

FIG. 10 shows an embodiment in which the light fiber input line 1 and the light fiber output line 4 are combined to form a single fiber line 1,4. Thus, only one transmission line is required. The white light w emitted by light source 2 passes through a semi-transmitting mirror 29 into the transmission line 1, 4 and thence to a sensing member such as a liquid crystal 30. The crystal 30 is exposed to the influence of a magnetic field, which is the quantity M to be measured. The effect of the magnetic field is that the color of the light passing through the liquid crystal 30 changes from whitek to blue b, for example. The light transmitted by the liquid crystal 30 impinges on a mirror 31 and is relected back into the fiber line 1,4. Reflected by the semi-transmitting mirror 29, the returning light b arrives at a beam splitter 15.

The further evaluation may be exactly as in the embodiment according to FIG. 5. Illustrated in FIG. 10 is, however, a somewhat simpler light detector arrangement. In this detector device the two photoconductive cells 16 and 17 form a voltage divider which is fed by a voltage stabilized by a Zener diode 32. The measuring instrument 6 measures the voltage of the photoconductive cell 17.

An interference filter 12–14 movable within a gap between two optical transmission lines 1 and 4 in the direction of the light beam has been shown in FIG. 5. However, it is also possible to design the interference filter such that the motion is in a direction vertical to the light beam. In such an interference filter, the distance d should vary. Such a vertically movable interference filter is shown in FIG. 11.

Figure 11:
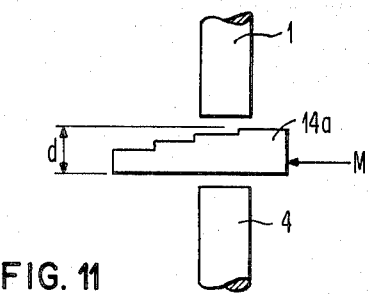
FIG. 11 is a partial view of an embodiment of a fiber optical sensor containing a stepped interference filter.

According to FIG. 11, a transparent medium 14a is arranged between the lines 1 and 4. This medium 14a contains a plurality of steps. In other words, the thickness of the medium varies increasingly from step to step.

Depending on the parameter M and therefore on the position of the medium 14a, a particular one of these steps determines the optically effective distance d. The illustrated design incorporating a vertical displacement possibility may be chosen where space problems prevail.

Instead of an interference filter containing a stepped medium 14a (see FIG. 11), it is also possible to use an absorption filter to provide for an action of the parameter M perpendicularly to the sensing light beam. Such a solution may be less expensive than the one shown in FIGS. 1 and 11.

Figure 12:
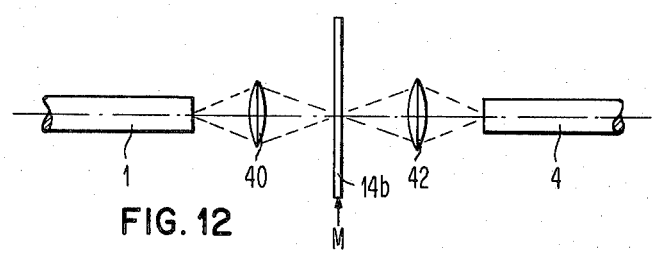
FIG. 12 is a view of a portion of an embodiment of a fiber optical sensor device containing an absorption filter.
Figure 14:
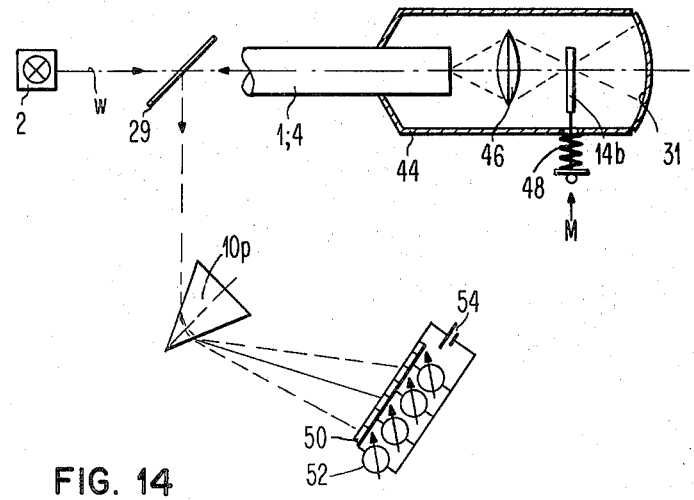
FIG. 14 is another embodiment of a fiber optical sensor device containing an absorption filter.

Sensor arrangements with absorption filters 14b in the gap between the transmission lines 1 and 4 are shown in FIGS. 12 and 14. In both cases, the absorption filter 14b is movable perpendicularly to the main direction of the light beam entering the gap. In FIG. 12, the absorption filter 14a is arranged between two lenses 40 and 42 which are provided for focussing the impinging light beam and for collecting the transmitted light beam, respectively.

Figure 13:
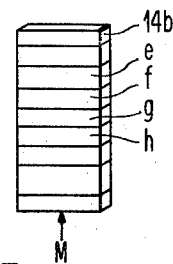
FIG. 13 is an embodiment of an absorption filter.

As indicated in FIG. 13, the absorption filter 14b may consist of a certain number of selections e,f,g,h each of which is permeable to light of a certain wavelength. Therefore, the different sections e,f,g,h represent adjacent colors in the optical spectrum of a light source emitting white light. As indicated, there may be provided several distinguished color steps. In contrast hereto, the colors of the absorption filter 14b may also overlap (not shown) from section to section.

According to FIG. 14, an absorption filter 14b is used in an arrangement similar to the one illustrated in FIG. 10. The filer 14b is contained in a cylindrical housing 44. The output end of the combined fiber optical line 1,4 merges into the housing 44. Light from the output end is directed through a lens 46 in a converging beam onto the filter 14b. The filter 14b is displaceable under the influence of a parameter M perpendicularly to the main light direction, as indicated by an arrow. The upward movement of the filter 14b is counteracted by a spring 48. The light of a certain color transmitted by the filter 14b is reflected by the inner end wall of the housing 44. This end wall is curved and acts as a reflector 31. The light is reflected back through the absorption filter 14b and the lens 46 into the transmission line 1,4. Finally by means of a semi-transparent mirror 29, the light is directed to a prism 10p.

The prsim 10p is part of a frequency sensitive detector. It deflects and directs the arriving light to an array 50 of light sensitive elements. Each of these elements may be electrically connected to a measuring instrument 52, or to some other sort of evaluation device. In the embodiment of FIG. 14, all parts and components, including the prism 10p and the individual sensitive elements of the array 50, are fixed. This is of particular advantage.

Absorption filters have been used as discriminators 18 and 19 in combination with photoconductive cells 16 and 17 in the embodiments of FIGS. 5 and 10. According to FIG. 14, the absorption filter 14b in combination with a prism 10p is used in their place. This embodiment may therefore exhibit further particular advantages. The uniformly colored light, which arrives at the prism 10p from the movable filter 14b, can provide a very fine light bundle. This light bundle is displaced on the array 50 according to the displacement of the filter 14b. During such a move, the electric resistance of an optical sensor 50 may be changed in accordance with the position of the light beam as will be shown in FIG. 17. In the solution illustrated in FIG. 14 the array 50 is used as a digital grey scale discriminator as will be explained in FIG. 16.

Figure 15:
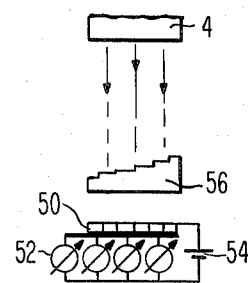
FIG. 15 is an embodiment of a light detector device for application in a fiber optical sensor device.

In FIG. 15 another form of a light sensing device is illustrated. Instead of a filter 18 or 19, this device contains a stepped interference filter 56 in a fixed position. This interference filter 56 may be smaller than the filter 14a in FIG. 11. It is located at the exit end of the transmission line 4 (FIGS. 1 and 5), or in the light path behind the semi-transparent mirror 29 (FIG. 10). In this case also, an array 50 of individual detectors may be applied as the photosensitive device. Each of the individual detectors is here associated with a step of the filter 56. Measuring instruments 52 or data processing devices provide for the evaluation of the measured values.

Figure 16:
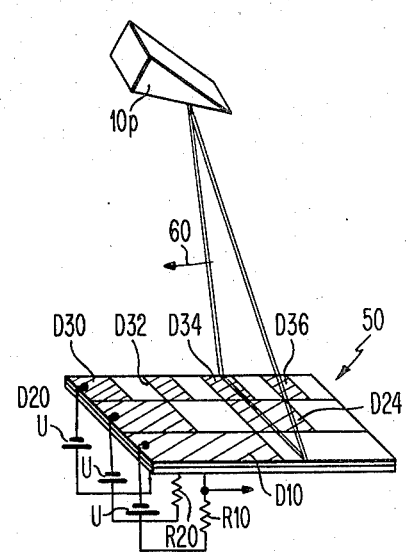
FIG. 16 is an embodiment of a light detector device for a fiber optical sensor, including an array of photo diodes.

In FIG. 16 is illustrated an array 50 or grey scale discrimination in greater detail. The grey scale discriminator consists of several rows of light sensitive diodes D10, D20, D24, . . . D36 or other optical sensors (such as photo resistors), and free spaces in between. In the first row, there are arranged the diode D10 and a free space. In the second row, there are arranged the diode D20, a free space, the diode D24, and another free space. In the third row, there are arranged the diode D30, a free space, the diode D32, another free space, the diode D34, another free space, the diode D36 and another free space. The diodes D10–D36 are connected through resistors R10, R20, . . . R36, respectively, to one or more voltage sources having the voltage U. The signals derived from these resistors R10, . . . R36 are evaluated. Thus, the first row exhibits a total of two digits, the next row a total of four digits, etc. Beginning from the right side, as the thin light fan moves across the array 50 in the direction of the arrow 60, different combinations of exposed diodes D10–D36 occur. Beginning at the right end, none of the diodes D10 through D36 is affected. As the fan moves along, first the diode D36 will receive light. Subsequently, the diode D24 will be affected. Then, both diodes D24 and D34 are illuminated. Finally, on the left side of the array 50, all three diodes D10, D20, and D30 will receive light from the light fan.

Thus, as the light fan moves along, different combinations of exposed diodes D10–D36 result in different combinations of digits. These digits can be further processed by a parallel/series shift register or similar device.

Figure 17:
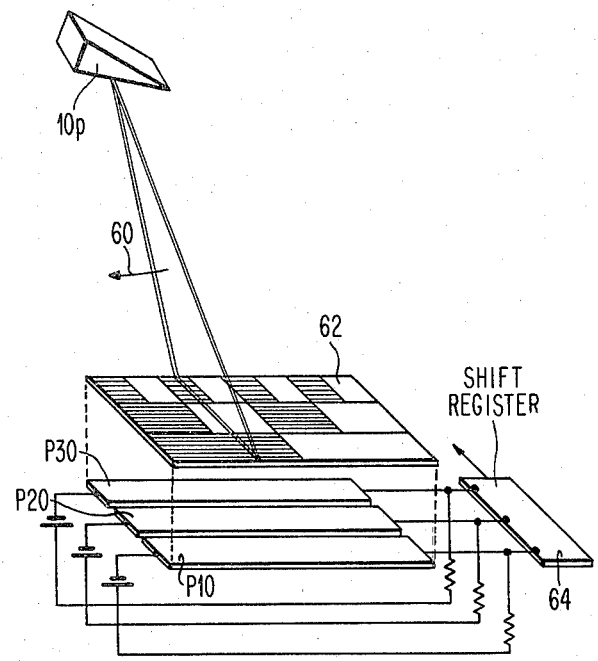
FIG. 17 is another embodiment of a light detector device for a fiber optical sensor, including a number of photo resistors.

It will be noted from FIG. 17, that instead of the arrangement of the diodes D10–D36 shown in FIG. 16, it is possible to use simple diodes or resistance strips P10, P20, P30, . . . and achieve the digitizing effect by an overlay 62 having the pattern as illustrated in FIG. 16. FIG. 17 shows that the varying combinations of resistance values may be applied to an evaluation circuitry 64 including a shift register. This shift register is basically a storage element. Data are read into it in parallel, and they are read out in series. The arrangement in FIG. 17 may be used in connection with the arrangement of FIG. 14, that is using a reflector 31 and a combined fiber line 1,4 for input and output of the sensing light beam.

Figure 18:
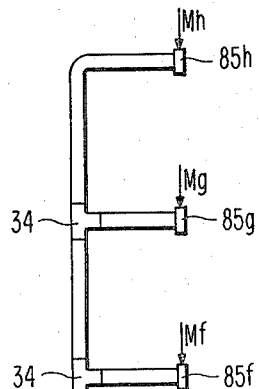
FIG. 18 is a fiber optical sensor system comprising various fiber optical sensor devices for multiplex operation.
Figure 18:
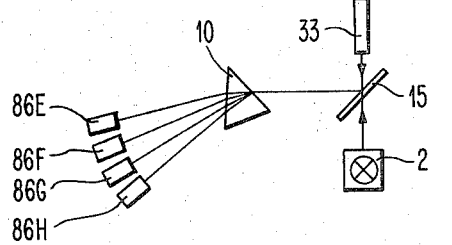
Figure 20:
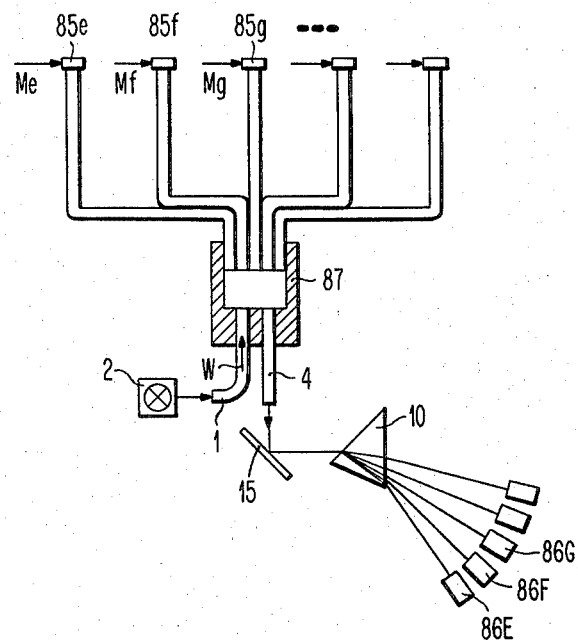
FIG. 20 is another embodiment of a fiber optical sensor system comprising various sensors.

Often a large number of optical sensors or transmitters is needed for electronic control systems. Such systems would make it necessary to install as many light fiber lines from the individual measuring points to a central processing station as there are measuring points. In FIGS. 18 and 20 is illustrated that in such a case the number of optical transmission lines can be considerably reduced by utilizing the principle of light frequency modulation according to the invention and by utilizing multiplexing procedures.

In FIG. 18, the light source 2 emits light having a wide spectrum. The light enters a light collecting line 33 through a semi-transparent mirror 15. The light then passes via so-called T-couplers 34 to optical transmitters 35e-35h which are arranged at the end of individual fiber lines branching from the T-couplers 34. Each of these transmitters 34e-35h may include, for example, a frequency-selective filter as the Fabry-Perot filter 12-14 shown in FIG. 5 or the filter element 30 shown in FIG. 10, having arranged thereafter a reflector or mirror, such as the reflector 31 in the arrangement according to FIG. 10. The relected light is returned via the T-couplers 34 and the mirror 15 to a dispersing prism 10 and from there to four light receiving devices 86E-86H, which may be photo diodes. They may also be constructed like the light sensing devices illustrated in FIGS. 5 and 10. In this embodiment, instead of the prism 10, there may be provied a number of secondary filters for separating various wavelength components before measuring their intensities.

Figure 19:
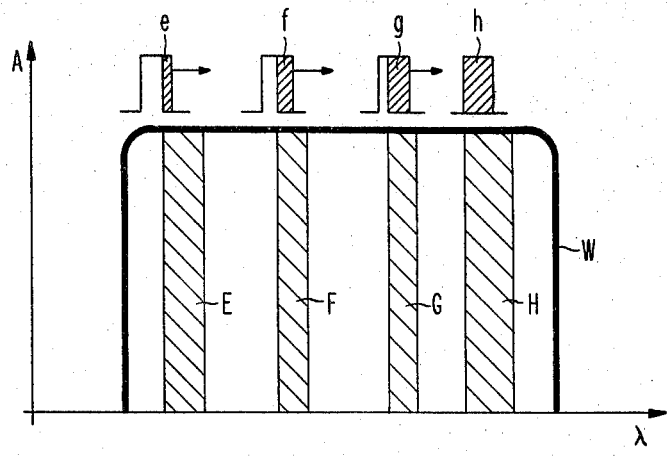
FIG. 19 is a diagram of the sensitivities of the sensor devices shown in FIG. 18.

In FIG. 19, the curve W represents the spectral distribution of the light emitted by the light source 2. The emitted light has a relatively wide spectrum. Due to an appropriate design of their filters, the individual receiving devices 86E-86H are transparent only for spectral ranges marked E-H, respectively, in FIG. 19. Thus, the receiving device 86E is transparent only for the spectral range marked E, the receiving device 86F only for the spectral range marked F, etc. On a greatly reduced ordinate scale, the curves e-h in the upper part of FIG. 19 represent the spectral sensitivities of the individual transmitters 85e-85h containing a frequency-selective filter. The width of their transmission bands approximately corresponds to that of the receiving devices 86E-86H, respectively. These transmission bands can be shifted under the influence of parameters Me, Mf, Mg, Mh, e.g. in the manner illustrated in FIG. 5. The transmission ranges of the frequency-selective filter and the associated receiving device will overlap, the extent of overlapping depending upon the influence of the measured quantity Me, Mf, Mg, Mh, respectively. Only light components of corresponding size will be received in the receiving devices 86E, 86F, 86G and 86H, respectively.

The color multiplexing device according to FIG. 18 may be used for measurement of various parameters in an automobile.

FIG. 20 shows a second embodiment of an optical multiplex operation, where a so-called star coupler 87 is used. The light w emitted by the light source 2 and having a very wide frequency band gets into a light fiber input line 1 serving as a collector line. In the star coupler 87 this line 1 branches out into light fiber lines leading to individual transmitters 85e, 85f, 85g, etc., each including a frequency-selective filter and each sensitive to a parameter Me, Mf, Mg, respectively. In the star coupler 87 the returning light components are coupled into a common light fiber output line 4. These components are conducted to the light receiving devices 86E, 86F, 86G, etc., as in the arrangement according to FIG. 18.

The basic structures of the optical networks illustrated in FIGS. 18 and 20 may also be combined with each other. Thus, for example, five of the optical networks illustrated in FIG. 18 may be energized by a star coupler 87 according to FIG. 20. Thereby, twenty optical transmitters may be applied.

While the forms of the fiber optical sensor device herein described constitute preferred embodiments of the invention, it is to be understood that the invention is not limited to these precise forms of assembly, and that a variety of changes may be made therein without departing from the scope of the invention.

What is claimed is:

1. A fiber optical sensor device for measuring a physical parameter, comprising in combination:
   (a) a light source for emitting light;
   (b) a first light transmitting fiber having a first light input end receiving light from said light source, and having a first light output end delivering light which is transmitted thereto from said light input end;
   (c) means for dispersing the light transmitted by said first light transmitted fiber into its spectral components;
   (d) a second light transmitting fiber having a second light input end receiving said spectral components dependent upon said physical parameter, and having a second light output end emitting said spectral components; and
   (e) detector means for detecting the spectral components emitted by said second light transmitting fiber;
wherein said means for dispersing the light is a prism, which is arranged between the first light output end of said first light transmitting fiber and the second light input end of said second light transmitting fiber, said prism being rotatable around an axis dependent upon said physical parameter.

2. The sensor device according to claim 1, wherein at least one diaphragm is arranged between the first light output end of said first light transmitting fiber and said prism.

3. The sensor device according to claim 1, wherein a first lens is arranged between the first light output end and the prism, said first lens directing a parallel beam onto the prism, and wherein a second lens is arranged between the prism and said second light input end, said second lens focussing the spectral components from the prism onto the second light input end.

4. The sensor device according to claim 3, wherein a direction filter is arranged between the first and the second lens.

5. A fiber optical sensor device for measuring a physical parameter, comprising in combination:
   (a) a light source for emitting light;
   (b) a first light transmitting fiber having a first light input end receiving light from said light source, and having a first light outut end delivering light which is transmitted thereto from said light input end;
   (c) means for dispersing the light transmitted by said first light transmitting fiber into its spectral components;
   (d) a second light transmitting fiber having a second light input end receiving said spectral components dependent upon said physical parameter, and having a second light output end emitting said spectral components; and
   (e) detector means for detecting the spectral components emitted by said light transmitting fiber;

wherein said means for dispersing the light comprises the first light output end of said first light transmitting fiber, said first light output end being shaped as to disperse light transmitted by said first light transmitting fiber, and wherein means are provided for generating a relative motion between the first output end and the second light input end dependent upon said physical parameter.

6. The sensor device according to claim 5, wherein the first light output end is a plane face which is inclined towards the symmetry axis of said first light transmitting fiber, and wherein said second light input end is movable with respect to said first light output end.

* * * * *